(12) United States Patent
Zhu et al.

(10) Patent No.: US 7,922,955 B2
(45) Date of Patent: Apr. 12, 2011

(54) METHOD FOR PRODUCING A RUBBER DIAPHRAGM, ESPECIALLY FOR MOTOR VEHICLE BRAKES

(75) Inventors: Xianqiao Zhu, Yuyao (CN); Qichao Tang, Yuyao (CN); Binghong Qin, Yuyao (CN); Zhenxin Yang, Yuyao (CN)

(73) Assignee: Xianqiao Zhu, Yuyao (CN)

( * ) Notice: Subject to any disclaimer, the term of this patent is extended or adjusted under 35 U.S.C. 154(b) by 88 days.

(21) Appl. No.: 12/411,372

(22) Filed: Mar. 25, 2009

(65) Prior Publication Data
US 2009/0260515 A1 Oct. 22, 2009

(30) Foreign Application Priority Data
Mar. 25, 2008 (CN) .............. 2008 1 0060882

(51) Int. Cl.
B29C 43/18 (2006.01)
B29C 43/20 (2006.01)
B29C 43/56 (2006.01)
F01B 19/00 (2006.01)

(52) U.S. Cl. .............. 264/279.1; 264/325; 264/347; 264/259; 92/103 R; 92/96

(58) Field of Classification Search .............. 264/259, 264/325, 279.1, 347; 92/103 R, 96
See application file for complete search history.

(56) References Cited

U.S. PATENT DOCUMENTS

| | | | | | |
|---|---|---|---|---|---|
| 1,388,123 | A | * | 8/1921 | Roberts | 156/81 |
| 2,203,124 | A | * | 6/1940 | Barry | 152/338.1 |
| 3,508,988 | A | * | 4/1970 | Waller | 156/123 |
| 3,790,425 | A | * | 2/1974 | Leblond | 156/416 |
| 3,853,653 | A | * | 12/1974 | Olbert et al. | 156/130.7 |
| 4,989,497 | A | * | 2/1991 | Lerma | 92/103 SD |
| 5,061,430 | A | * | 10/1991 | Lang | 264/316 |
| 5,220,863 | A | * | 6/1993 | Scott et al. | 92/103 F |
| 6,391,460 | B1 | * | 5/2002 | Tanaka et al. | 428/421 |
| 6,685,864 | B2 | * | 2/2004 | Bingle et al. | 264/254 |
| 6,746,637 | B1 | * | 6/2004 | Huss et al. | 264/135 |
| 2001/0007222 | A1 | * | 7/2001 | Castel et al. | 91/376 R |
| 2003/0230192 | A1 | * | 12/2003 | Ohrle et al. | 92/103 F |
| 2005/0092258 | A1 | * | 5/2005 | Markham | 119/707 |
| 2005/0129890 | A1 | * | 6/2005 | Wang | 428/36.9 |
| 2006/0131801 | A1 | * | 6/2006 | Barickman et al. | 267/293 |
| 2009/0197050 | A1 | * | 8/2009 | Pridie | 428/174 |
| 2010/0295329 | A1 | * | 11/2010 | Sapak et al. | 296/1.08 |

FOREIGN PATENT DOCUMENTS
JP 03147819 A * 6/1991
* cited by examiner

*Primary Examiner* — Joseph S Del Sole
*Assistant Examiner* — Nahida Sultana
(74) *Attorney, Agent, or Firm* — Matthias Scholl P.C.; Matthias Scholl

(57) ABSTRACT

A method for producing a rubber diaphragm, comprising: (a) preparing materials; (b) primary forming: putting a first rubber film into a lower mold cavity of a diaphragm mold, covering the film with a canvas, positioning the canvas via a mold ring, switching on a primary upper mold on a vulcanizer, pushing the mold into a center of a hot plate of the vulcanizer, and performing primary forming for 30-40 seconds under a setting temperature of 152-157° C. and holding pressure of 16-18 MPa; and (c) secondary forming and curing: taking the mold out, removing the upper mold, putting the second rubber film into a mold cavity and switching on a secondary upper mold, pushing the mold into a center of the hot plate, and performing secondary forming and curing for 5-5.5 minutes under a setting temperature of 152-157° C. and holding pressure of 16-18 MPa. A rubber diaphragm produced by this method.

18 Claims, 3 Drawing Sheets

METHOD FOR PRODUCING A RUBBER DIAPHRAGM, ESPECIALLY FOR MOTOR VEHICLE BRAKES

CROSS-REFERENCE TO RELATED APPLICATIONS

Pursuant to 35 U.S.C. §119 and the Paris Convention Treaty, this application claims the benefit of Chinese Patent Application No. 200810060882.5 filed on Mar. 25, 2008, the contents of which are incorporated herein by reference.

BACKGROUND OF THE INVENTION

1. Field of the Invention

The invention relates to a method for producing a rubber diaphragm for use in vehicle brakes.

2. Description of the Related Art

Rubber diaphragm is an important component of vehicle brakes. A conventional method for producing the rubber diaphragm includes a primary forming process and a secondary curing process. However, the conventional method suffers from the following problems: first, the canvas used as support in the diaphragm is easily decentered; second, the adhesive force between the canvas and the second rubber film is poor; third, the curing time is long, which reduces the adhesive force and affects the quality and the production rate; and fourth, the method cannot produce a rubber diaphragm having a frustoconical angle of inclination of less than or equal to 20° and concurrently a depth greater than or equal to 40 mm.

SUMMARY OF THE INVENTION

In view of the above-described problems, it is one objective of the invention to provide a method for producing a rubber diaphragm for a vehicle brake that features a centered canvas and high adhesive force between the canvas and a second rubber film, and is capable of improving quality and production rate.

To achieve the above objectives, in accordance with one embodiment of the invention, provided is a method for producing a rubber diaphragm for a vehicle brake, comprising:

(a) preparing materials: producing, measuring and cutting a first rubber film, a second rubber film and a canvas;

(b) primary forming: putting the first rubber film into a lower mold cavity of a diaphragm mold, covering the film with the canvas, positioning the canvas via a mold ring, switching on a primary upper mold on a vulcanizer, pushing the mold into a center of a hot plate of the vulcanizer, and performing primary forming for 30-40 seconds under a setting temperature of 152-157° C. and holding pressure of 16-18 MPa, auto exhaustion being performed for 3-4 times or vacuum pumping being performed;

(c) secondary forming and curing: taking the mold out, removing the upper mold, putting the second rubber film into a mold cavity and switching on a secondary upper mold, pushing the mold into a center of the hot plate, and performing secondary forming and curing for 5-5.5 minutes under a setting temperature of 152-157° C. and holding pressure of 16-18 MPa, auto exhaustion being performed for 3-4 times or vacuum pumping being performed; and (d) mold opening, and trimming the mold after the mold has cooled.

In certain embodiments of the present invention, the thickness of the first rubber film is 3.5-4.5 mm.

In certain embodiments of the present invention, the thickness of the second rubber film is 3.5-4.5 mm.

In certain embodiments of the present invention, the size of the canvas is between 270×270 mm and 320×320 mm.

In certain embodiments of the present invention, the vulcanizer is a press rubber vulcanizer with an automatic opening and exhaust function.

In certain embodiments of the present invention, the vulcanizer is a vacuum rubber vulcanizer.

In certain embodiments of the present invention, the rubber diaphragm has strength sufficient for it to be used in heavy trucks above 3 tons with failure rates comparable or better than diaphragms applicable to such trucks made by conventional processes.

In certain embodiments of the present invention, a frustoconical angle of inclination of the rubber diaphragm is less than or equal to 20°, and a depth of the diaphragm is greater than or equal to 40 mm.

In certain embodiments of the present invention, a frustoconical angle of inclination of the rubber diaphragm is greater than or equal to 20°, and a depth of the diaphragm is less than or equal to 40 mm.

Advantages of the Invention Include:

- the primary forming process enables the canvas to be centered;
- the adhesive force between the canvas and the second rubber film is high;
- the curing time is reduced, which increases the adhesive force and therefore the quality and the production rate;
- a rubber diaphragm having a frustoconical angle of inclination less than or equal to 20°, and a depth of greater than or equal to 40 mm can be produced.

BRIEF DESCRIPTION OF THE DRAWINGS

The invention is described hereinbelow with reference to accompanying drawings, in which.

DETAILED DESCRIPTION OF THE EMBODIMENTS

Figure 1:
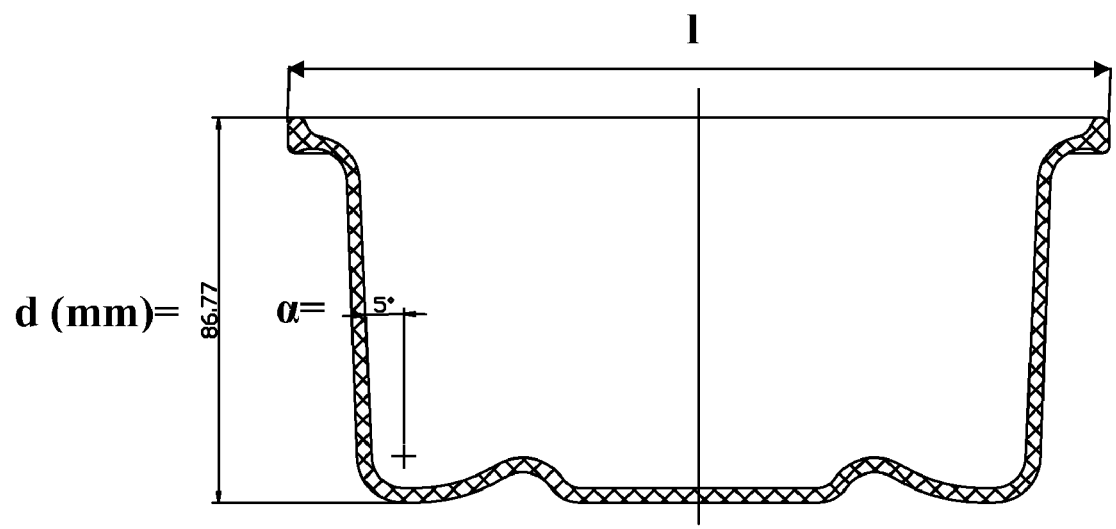
FIG. 1 shows a rubber diaphragm according to an exemplary embodiment of the invention, having diameter l, depth d=86.77 mm, and frustoconical angle of inclination $\alpha=5°$.
Figure 2:
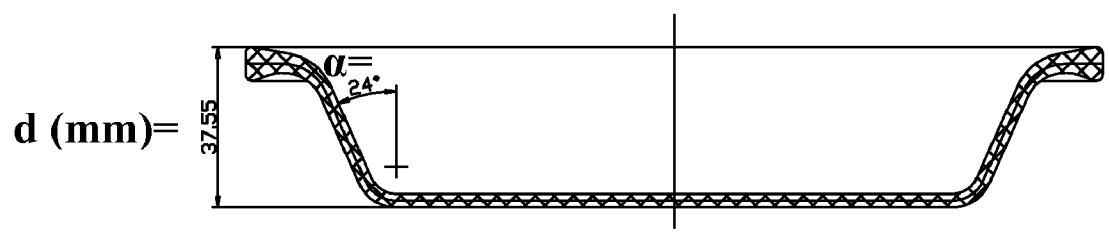
FIG. 2 shows a rubber diaphragm according to an exemplary embodiment of the invention, having depth d=37.55 mm, and frustoconical angle of inclination $\alpha=24°$.
Figure 3:
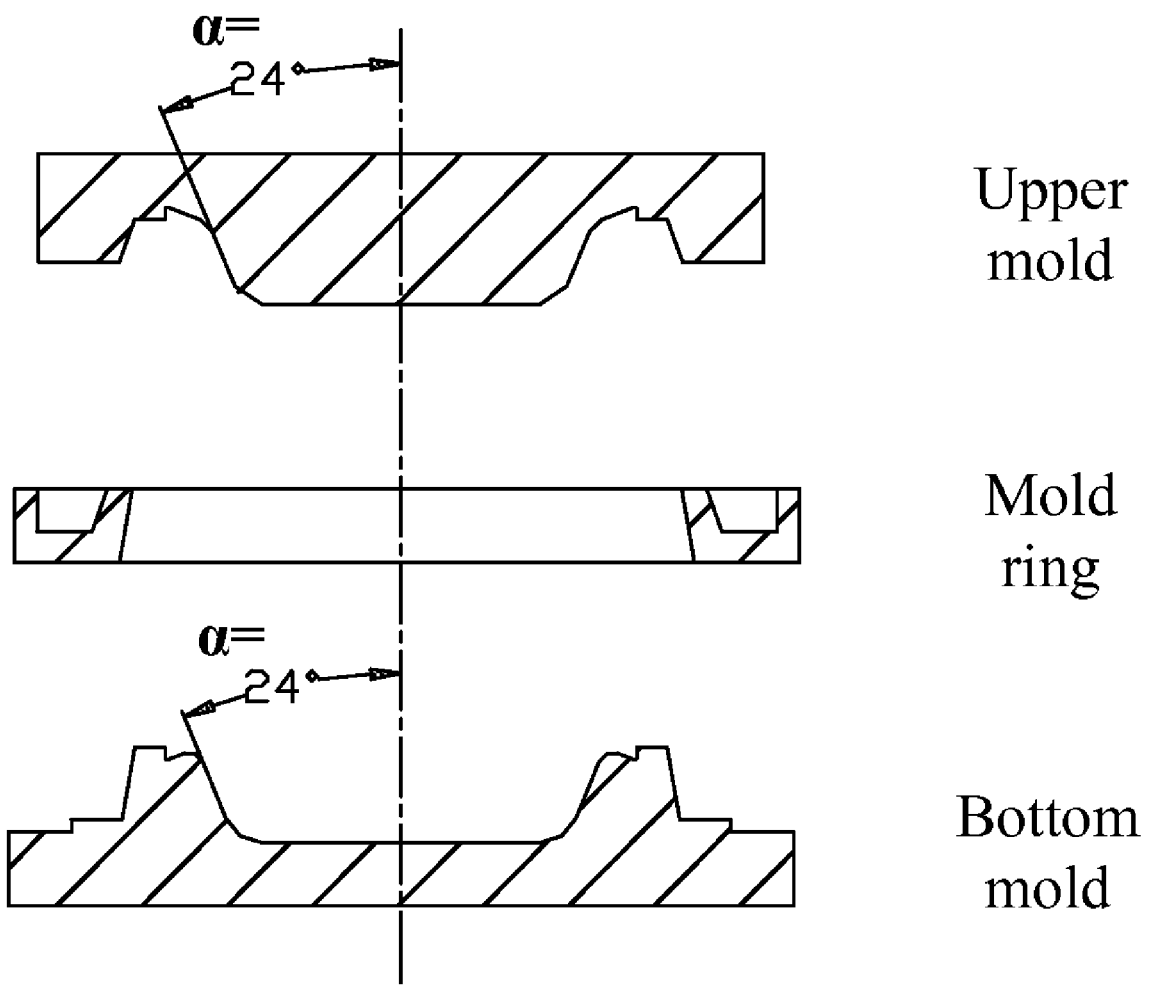
FIG. 3 shows a mold used in secondary forming and curing process to produce a rubber diaphragm of an exemplary embodiment shown in FIG. 2.
Figure 4:
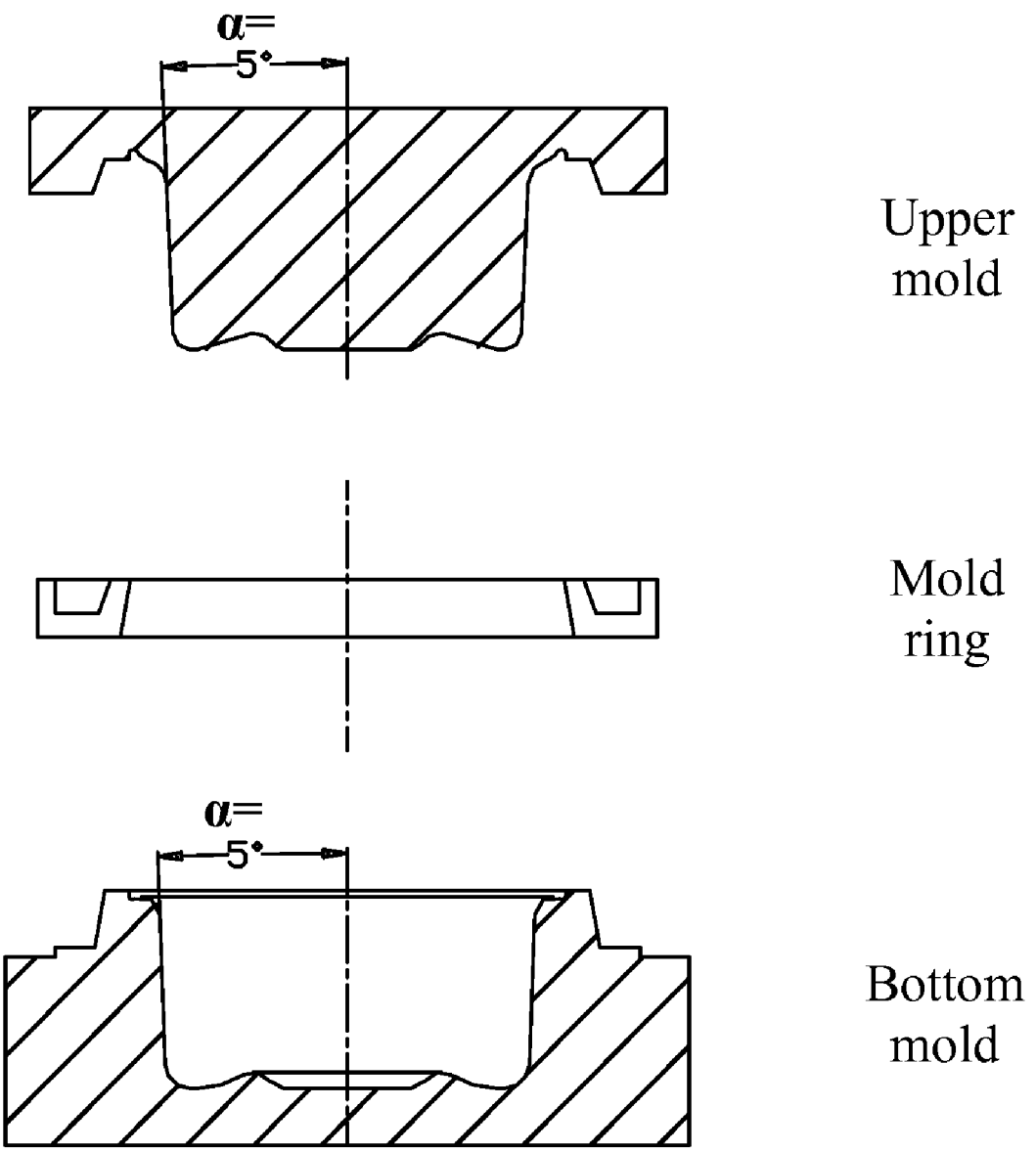
FIG. 4 shows a mold used in secondary forming and curing process to produce a rubber diaphragm of an exemplary embodiment shown in FIG. 1.

Detailed description will be given below in conjunction with particular embodiments.

Preparation of Films and Canvases

A first rubber film with a thickness of 3.5-4.5 mm and weight of 82 g±1 g is cut into a square. A second rubber film with a thickness of 2-2.5 mm and weight of 90 g±1 g is cut into a circle. The films have no visible bubbles or impurity on the surface. The weight of the first rubber film is 8-10 g less than that of the second rubber film, so as to prevent decentering of the canvas and cloth leakage at the edge of a rubber diaphragm. A canvas is cut into a square with a size between 270×270 mm and 320×320 mm (depending on an outer diameter and a depth of the rubber diaphragm).

During the forming and the curing process, a mold cover must not be contaminated with impurities whenever it is taken out or closed.

The primary forming process comprises putting the first rubber film into a lower mold cavity of a diaphragm mold, covering the film with the canvas, positioning the canvas via a mold ring, switching on a primary upper mold on a vulcanizer, pushing the mold into a center of a hot plate of the vulcanizer, and performing primary forming for 30-40 seconds under a setting temperature of 152-157° C. and holding pressure of 16-18 MPa. During the primary forming process, the vulcanizer automatically opens and exhausts for 3-4 times, so as to reduce bubbles and scars on the circumferential surface and at the bottom of the rubber diaphragm.

A secondary forming and curing process comprises: taking the mold out, removing the upper mold, putting the second rubber film into a mold cavity and switching on a secondary upper mold, pushing the mold into a center of the hot plate, and performing secondary forming and curing for 5-5.5 minutes under a setting temperature of 152-157° C. and holding pressure of 16-18 MPa, during which the vulcanizer automatically opens and exhausts for 3-4 times; and performing mold opening, and then trimming the mold after the mold is cooled.

In the following examples, the canvas used was made by China Wuxi Sanli Industrial Cloth Factory (described in China Pat. No. CN1266919).

Example 1

Production of a Rubber Diaphragm with a Diameter of 180 mm, a Frustoconical Angle of Inclination of 5° and a Depth of 57.5 mm The first rubber film was square, and had a thickness of 3.5 mm and weight of 82 g, and the canvas had a size of 320×320 mm. The second rubber film was circular, and had a thickness of 2 mm and weight of 90 g. The time length of the primary forming process was 35 seconds, and time length of the secondary forming and curing process was 5.5 minutes. The holding pressure was 17 MPa. The mold temperature was 152° C. The vulcanizer automatically opened and exhausted for 3 times.

The parameters of the produced rubber diaphragm are as follows: adhesive strength: 18 N/mm, bursting strength: 3.4 MPa.

Compared with a rubber diaphragm produced via a conventional method (the adhesive strength and the bursting strength of which were 14 N/mm and 3.3 MPa), the adhesive force of the rubber diagram made by the method of this invention is greatly increased.

Example 2

Production of a Rubber Diaphragm with a Diameter of 206 mm, a Frustoconical Angle of Inclination of 24° and a Depth of 44.2 mm The first rubber film was square, and had a thickness of 4.5 mm and weight of 83 g. The canvas had a size of 320×320 mm. The second rubber film was circular, and had a thickness of 2.5 mm and weight of 91 g. The time length of the primary forming process was 40 seconds, and the time length of the secondary forming and curing process was 5 minutes. The holding pressure was 18 MPa. The mold temperature was 157° C. The vulcanizer automatically opened and exhausted for 4 times.

The parameters of the produced rubber diaphragm are: adhesive strength: 19 N/mm, bursting strength: 3.6 MPa.

Compared with a rubber diaphragm produced via a conventional method (the adhesive strength and the bursting strength of which were 14 N/mm and 3.5 MPa), the adhesive force of the rubber diagram made by the method of this invention is greatly increased.

Example 3

Production of a Rubber Diaphragm with a Diameter of 200 mm, a Frustoconical Angle of Inclination of 23°, and a Depth of 38.7 mm The first rubber film was square, and had a thickness of 4 mm and weight of 81 g. The canvas had a size of 270×270 mm. The second rubber film was circular, and had a thickness of 2.2 mm and weight of 89 g. The time length of the primary forming process was 30 seconds, and the time length of the secondary forming and curing process was 5 minutes. The holding pressure was 16 MPa. The mold temperature was 154° C. The vulcanizer automatically opened and exhausted for 3 times.

The parameters of the produced rubber diaphragm were: adhesive strength: 18 N/mm, bursting strength: 3.6 MPa.

Compared with the rubber diaphragm produced via a conventional method (the adhesive strength and the bursting strength of which were respectively 14 N/mm and 3.5 MPa), the adhesive force of the rubber diagram made by the method of this invention is greatly increased.

It can be seen from the above-mentioned examples that the method comprising a primary forming process and a primary forming and curing process is a great improvement over the traditional secondary curing method. Specifically, the adhesive force is increased by 4-5 N/mm, the bursting strength is improved by 0.1 MPa, and the working life of the rubber diaphragm is extended to about 200 million times. Moreover, the production time length of a rubber diaphragm is reduced by 3-3.5 minutes, and therefore production rate is increased significantly and the production cost is decreased.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

All publications and patent applications mentioned in this specification are indicative of the level of skill of those skilled in the art to which this invention pertains. All publications and patent applications mentioned in this specification are herein incorporated by reference to the same extent as if each individual publication or patent application mentioned in this specification was specifically and individually indicated to be incorporated by reference.

The invention claimed is:

1. A method for producing a rubber diaphragm for a vehicle brake, comprising:
   (a) preparing materials: producing, measuring and cutting a first rubber film, a second rubber film and a canvas;
   (b) primary forming: putting said first rubber film into a lower mold cavity of a diaphragm mold, covering said film with said canvas, positioning said canvas via a mold ring, switching on a primary upper mold on a vulcanizer, pushing said mold into a center of a hot plate of said vulcanizer, and performing primary forming for 30-40 seconds under a setting temperature of 152-157° C. and holding pressure of 16-18 MPa, automatic opening and exhausting being performed for 3-4 times or vacuum pumping being performed;

(c) secondary forming and curing: taking said primary upper mold out, putting said second rubber film into a mold cavity and switching on a secondary upper mold, pushing said mold into a center of said hot plate, and performing secondary forming and curing for 5-5.5 minutes under a setting temperature of 152-157° C. and holding pressure of 16-18 MPa, automatic opening and exhausting being performed for 3-4 times or vacuum pumping being performed; and (d) performing mold opening, and then trimming said rubber diaphragm when said rubber diaphragm has cooled.

2. The method of claim 1, wherein the thickness of said first rubber film is 3.5-4.5 mm.

3. The method of claim 1, wherein the thickness of said second rubber film is 3.5-4.5 mm.

4. The method of claim 1, wherein the size of said canvas is between 270×270 mm and 320×320 mm.

5. The method of claim 1, wherein said vulcanizer is a press rubber vulcanizer with an automatic opening and exhausting function.

6. The method of claim 1, wherein said vulcanizer is a vacuum rubber vulcanizer.

7. The method of claim 1, wherein the rubber diaphragm has sufficient strength and durability to be used in heavy truck above 3 tons.

8. The method of claim 1, wherein the furstoconical angle of inclination (a) of the rubber diaphragm is less than or equal to 20°, and the depth (d) of the rubber diaphragm is greater than or equal to 40 mm.

9. The method of claim 1, wherein the frustoconical angle of inclination (a) of the rubber diaphragm is greater than or equal to 20°, and the depth (d) of the rubber diaphragm is less than or equal to 40 mm.

10. The method for producing a rubber diaphragm for a vehicle brake, comprising:

(a) primary forming: putting a first rubber film into a lower mold cavity of a diaphragm mold, covering said first rubber film with a canvas, positioning said canvas via a mold ring, switching on a primary upper mold on a vulcanizer, pushing said mold into a center of a hot plate of a vulcanizer, and performing primary forming for 30-40 seconds under a setting temperature of 152-157° C. and holding pressure of 16-18 MPa, during primary forming automatically opening and exhausting for 3-4 times or vacuum pumping; and (b) secondary forming and curing: taking said primary upper mold out, putting a second rubber film into a mold cavity, pushing said mold into a center of the hot plate, and performing secondary forming and curing for 5-5.5 minutes under a setting temperature of 152-157° C. and holding pressure of 16-18 MPa, during secondary forming and curing automatically opening and exhausting for 3-4 times or vacuum pumping.

11. The method of claim 10, wherein the thickness of said first rubber film is 3.5-4.5 mm.

12. The method of claim 10, wherein the thickness of said second rubber film is 3.5-4.5 mm.

13. The method of claim 10, wherein the size of said canvas is between 270×270 mm and 320×320 mm.

14. The method of claim 10, wherein said vulcanizer is a press rubber vulcanizer with an automatic opening and exhausting function.

15. The method of claim 10, wherein said vulcanizer is a vacuum rubber vulcanizer.

16. The method of claim 10, wherein the rubber diaphragm has sufficient strength and durability to be used in a heavy truck above 3 tons.

17. The method of claim 10, wherein the frustoconical angle of inclination ($\alpha$) of the rubber diaphragm is less than or equal to 20°, and the depth (d) of the rubber diaphragm is greater than or equal to 40 mm.

18. The method of claim 10, wherein the frustoconical angle of inclination ($\alpha$) of the rubber diaphragm is greater than or equal to 20°, and the depth (d) of the rubber diaphragm is less than or equal to 40 mm.

\* \* \* \* \*